(No Model.)

J. H. HARRELL.
JOINT FOR BICYCLE OR OTHER CONSTRUCTION.

No. 598,202. Patented Feb. 1, 1898.

Witnesses:
J. B. McGirr
David Chadwick

Inventor:
John H. Harrell,
By H. S. Appleman
Atty

UNITED STATES PATENT OFFICE.

JOHN H. HARRELL, OF NEW YORK, N. Y., ASSIGNOR TO BENJAMIN F. ALLEN, OF GROTON, CONNECTICUT.

JOINT FOR BICYCLE OR OTHER CONSTRUCTIONS.

SPECIFICATION forming part of Letters Patent No. 598,202, dated February 1, 1898.

Application filed October 24, 1896. Serial No. 610,008. (No model.)

*To all whom it may concern:*

Be it known that I, JOHN H. HARRELL, a citizen of the United States of America, residing at New York, in the county of New York and State of New York, have invented certain new and useful Improvements in Joints for Bicycle or other Constructions, of which the following is a specification, reference being had therein to the accompanying drawings.

My invention relates to an improved joint for connecting the handle-bars of bicycles to the heads, my object being to provide a joint which shall be capable of convenient and speedy adjustment and at the same time have the requisite degree of stability.

My invention has also for its object a construction whereby handle-bars of wood can be conveniently used if it is desired to use that material instead of metal.

Figure 1:
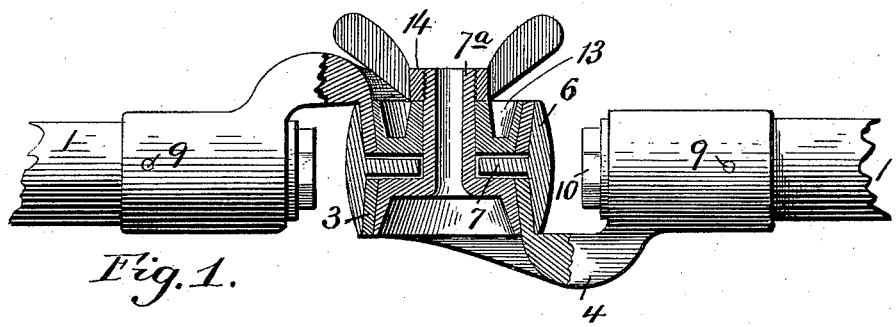
Figure 2:
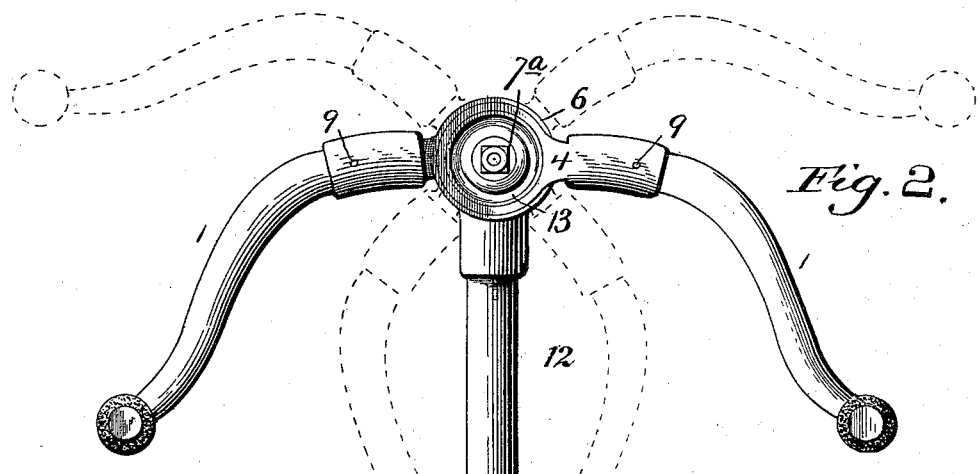
Figure 5:
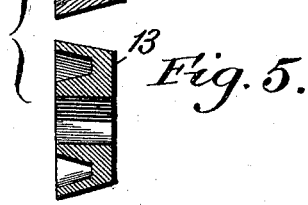
Figure 3:
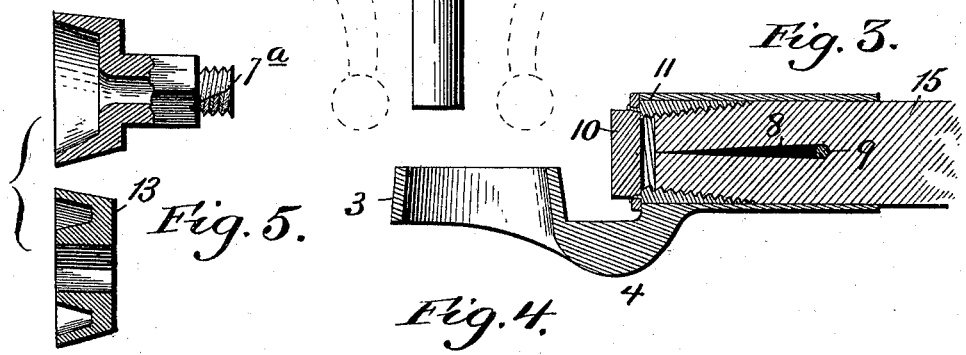
Figure 4:
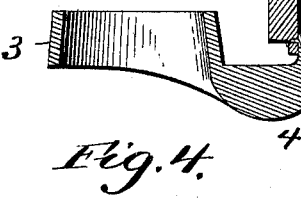

In the drawings forming a part of this specification, Figure 1 shows a horizontal section of the joint. Fig. 2 is a front view of a bicycle and handle-bars to which my invention has been applied, showing in broken lines the various positions which the handle-bars can be caused to assume. Fig. 3 is a sectional view showing my construction for attaching a wooden handle-bar to the head. Fig. 4 is a similar view of a wooden handle-bar partly inserted, and Fig. 5 is a detail view of a convenient form of the washer and bolt by which the parts of the joint are clamped together.

In applying my invention to a bicycle the usual handle-bar is cut in two in the middle and each half is provided with an extension 4, having conical inner and outer surfaces. The handle-bar stem 12 of the machine is provided with a head 6, having on either side a conical socket, each of these sockets being shaped and adapted to receive one of the conical rings 3. The head 4 is provided with a web 7, separating the sockets, which has in it a hole of square or other irregular shape through which passes a bolt $7^a$ of contour similar to the hole, so that it will not turn, and which has a conical-shaped head of such a size as to fit the interior of one of the rings 3. A conical-shaped washer 13 is provided of a size suited to fit the interior of the rings 3 and having a central opening of the same shape as the bolt $7^a$ and adapted to receive the same. The bolt $7^a$ is screw-threaded and is provided with a nut 14, which when screwed up binds the several parts together in the relation shown in Fig. 1.

It will be observed that inasmuch as the bolt $7^a$ is irregular in outline it cannot turn in the head 6, and the washer 13 is also prevented from turning by its engagement with the bolt. Consequently the only parts free to move in adjusting the handle-bar are the rings 3, and as these are held between conical faces a slight pressure brought to bear by means of the nut 14 causes a very great amount of friction upon the rings 3 and the latter are held very firmly in their position, while at the same time it is possible to move them for the purpose of adjustment by the sudden application of considerable force.

The extensions 4 may be formed on rods of metal, or where it is desired these may be attached to wooden bars, and I have devised a construction which I find to be useful and convenient where wooden bars are employed. In this construction the extension 4 is provided with a socket 11, adapted to receive the wooden bar or rod 15. This socket and bar are shown in section in Fig. 3, the bar being forced home into the socket. Fig. 4 shows a section of the two parts detached from each other. The part 10 is a nut for holding the two together. The end of the bar is made with two cross-slots, one of which is shown in Figs. 3 and 4, preferably at substantially right angles to each other and slightly tapering. The nut 10 is screw-threaded on its inner face, its sides tapering down until they are quite thin. When the bar is inserted, its tapering end enters the interior of the nut 10, and one of the slots receives a rod 9, fixed in the socket. This rod is for the purpose of preventing the bar from turning in the socket. Preferably, but not necessarily, the exterior of the bar 16 is threaded at its extremity to fit the threads in the interior of the nut 10. The bar having been inserted until its tapering end enters the nut the nut is turned until its screw-threads, engaging with the screw-threads upon the bar, (or cutting screw-threads in the bar,) draw the latter into the position shown in Fig. 3.

What I claim is—

1. The combination of two bicycle handle-bars, an extension from each bar having a conical bearing-surface, a head having recesses adapted to receive said extensions and provided with conical bearing-surfaces to engage with the bearing-surfaces of the extension, said conical bearings and recesses having a common center and forming together a pivot about which the handle-bars may swing in an approximately vertical plane, and means for clamping these parts, substantially as set forth.

2. The combination of two bicycle handle-bars, an extension from each bar, each extension being provided with an exterior and an interior conical bearing-surface, a head provided with two recesses, each recess having a conical bearing-surface to engage with the exterior conical surface of one of the extensions, a bolt having a head with a conical bearing-surface adapted to engage with the interior conical bearing-surface of one of the extensions, a washer having a conical bearing-surface adapted to engage with the interior conical bearing-surface of the other extension, and a nut for clamping the parts together, substantially as set forth.

3. The combination of two bicycle handle-bars, an extension from each bar, each extension being provided with an exterior and an interior conical bearing-surface, a head provided with two recesses, each recess having a conical bearing-surface to engage with the exterior conical surface of one of the extensions, a bolt having a head with a conical bearing-surface adapted to engage with the interior conical bearing-surface of one of the extensions, a washer having a conical bearing-surface adapted to engage with the interior conical bearing-surface of the other extension, a nut for clamping the parts together, and means for preventing the rotation of the bolt, substantially as set forth.

4. The combination of two bicycle handle-bars, each having an extension provided with interior and exterior conical surfaces, a head provided with two recesses, each having a conical surface adapted to engage with the exterior conical surface of one of the extensions, a bolt having a conical surface adapted to engage with the interior conical surface of one of the extensions, a washer having a conical surface adapted to engage with the interior conical surface of the other extension, a bolt for clamping the parts together and a web forming a part of the head having a hole through the same of irregular shape for the bolt, the bolt being also of irregular shape, substantially as set forth.

5. The combination of the socket, nut 10 and the bar having a slit in the end thereof, and the rod 9 to prevent rotation of the bar, substantially as set forth.

6. The combination of two bicycle handle-bars, an extension from each bar, each extension being provided with an exterior and interior conical bearing-surface, a head provided with two recesses, each recess having a conical bearing-surface to engage with the exterior conical bearing-surface of one of the extensions, and a device having conical bearing-surfaces for engaging with the interior conical bearing-surfaces of the extensions for clamping the parts together, substantially as set forth.

7. The combination of two bicycle handle-bars, an extension from each bar, each extension being provided with an exterior and interior conical bearing-surface, a head provided with two recesses, each recess having a conical bearing-surface to engage with the exterior conical bearing-surface of one of the extensions, a device having conical bearing-surfaces for engaging with the interior conical bearing-surfaces of the extensions for clamping the parts together, and means for preventing the rotation of the clamping device, substantially as set forth.

In testimony whereof I affix my signature in presence of two witnesses.

JOHN H. HARRELL.

Witnesses:
S. A. TERRY,
F. S. APPLEMAN.